June 7, 1927.　　　　O. MILLER　　　　1,631,878

AUTOMATIC TAKE-UP BOLT

Filed April 26, 1924

INVENTOR
Otto Miller
BY Thornton Rogert
ATTORNEY

Patented June 7, 1927.

1,631,878

UNITED STATES PATENT OFFICE.

OTTO MILLER, OF CINCINNATI, OHIO.

AUTOMATIC TAKE-UP BOLT.

Application filed April 26, 1924. Serial No. 709,133.

This invention relates to an automatic take up bolt of the type described in my copending application serially numbered 599,582 which was filed upon Nov. 7, 1922, now Patent No. 1,491,875, issued April 29, 1924.

An object of the invention now to be described is to provide a safety device for preventing the nut of the take up bolt from loosening should the nut actuating spring become broken or disengaged from the nut.

A further object is to produce a construction which will prevent damage to other parts of an engine should a nut actuating spring become broken through crystallization of its material caused by vibration.

A further object is to provide means for and located within the take up bolt, which, without tools, may be used to tension the nut actuating spring.

These and other objects are attained in the take up bolt described in the following specification and illustrated in the accompanying drawing, in which.

Figure 2:
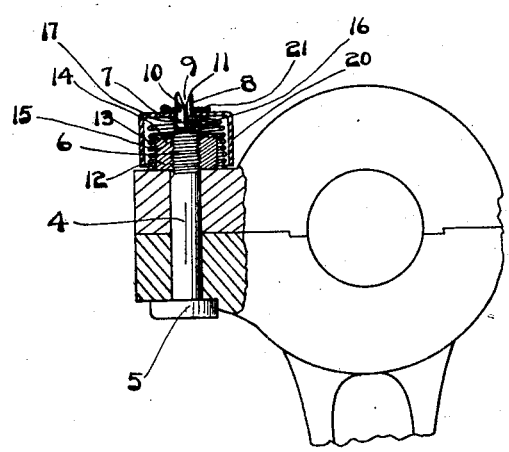
Fig. 2 is a view, partially in section and partially in elevation, taken on the line 2—2 of Fig. 1.

My improved bolt consists of a body 4 having a head 5 at one end and screw threads 6 at the opposite end, the latter terminating in a split shank having two branches 7 and 8 between which a slot 9 is located, the ends of the branches being provided with inclined end surfaces 10 and 11 which form a ratchet-like structure for a purpose to be described. Upon the screw threads is mounted a nut 12 which on its under side is slotted to receive the lower end 18 of a nut actuating spring 13. The upper side of the nut is provided with a series of ratchet teeth 14 which are adapted to receive the end 15 of a spring pawl 16 which has its opposite end 17 extending transversely or in a diametrical direction in order to engage the slot 9 as shown in Fig. 2. The upper end 19 of spring 13 is bent to extend transversely or diametrically in order to engage the slot 9 after end 17 of spring 16 is located therein. Following the positioning of the nut 12 and springs 13 and 16 a cup-like cap 20 is placed over split shank branches 8 and 10, the cup being followed by a cotter pin 21 which is placed through apertures 22 in the branches to retain the parts in position.

In conditioning my improved bolt for operation I place the connecting rod cap in position and then pass the bolt shank through the lugs of the rod and cap. The nut is then screwed down by one's fingers into engagement with the cap lug. The pawl spring 16 is then placed in position with end 17 in slot 9 and end 15 in engagement with teeth 14 of the nut. Cup 20 is then placed over branches 10 and 11. In the cup I have stamped inwardly two ears 23 and 24 which are adapted to engage end 19 of spring 13 when the cup is rotated, so that the spring may be wound in a clockwise direction sufficiently tight to cause nut 12 automatically to tighten upon the cap when any wear takes place.

Figure 1:
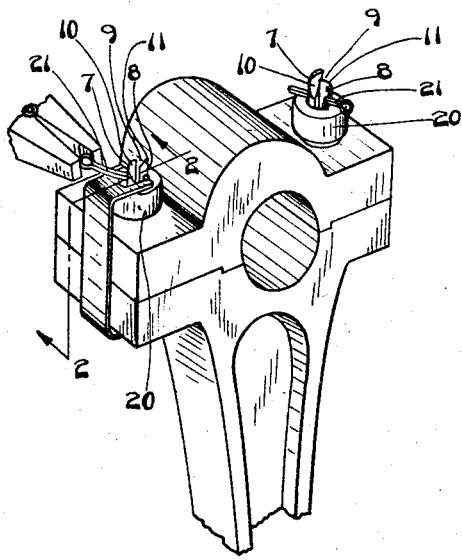
Fig. 1 is a fragmental perspective view of the cap end of a connecting rod equipped with bolts embodying my invention, the nut ends of the bolts being shown.
Figure 3:
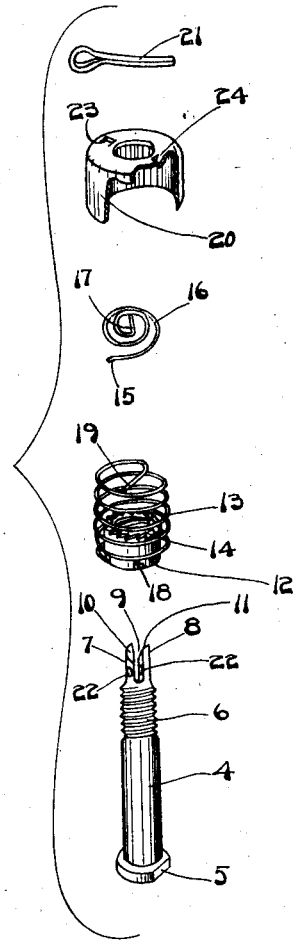
Fig. 3 is a composite view showing in proper relation, but spaced from one another, the parts of the bolt embodying my invention.

The winding operation is accomplished with the end 19 riding over the inclined ends 10 and 11 so that this operation will be permitted, but unwinding prevented. After sufficient tension has been placed upon spring 13 the cup is pushed toward the connecting rod cap until holes 22 are disclosed to permit cotter pin 21 to be inserted in order to retain the two springs in position. Should any conditions arise to permit the nut to be tightened under the urge of spring 13, the end 15 of spring 16 will snap over the teeth 14 as they present themselves during such nut movement, and should spring 13 break at any time, spring 16 will prevent the nut backing away to loosen the cap. The pieces of a broken spring 13 would be retained within the cup and be prevented from damaging the engine mechanism. Thus cup 20 performs the two functions of facilitating spring winding and preventing broken springs from causing damage. A convenient feature of the invention consists in the provision of a clip which, as shown in Fig. 1, will hold the cup 20 and its contained parts while the cotter pin is being placed in position, as shown.

Having thus described my invention what I claim is:

1. An automatic take up bolt comprising a threaded member having a reduced shank, a nut having screw threads for cooperation with the threaded member, a nut tightening spring attached to the nut, and a pawl spring; said shank having a ratchet shaped end adapted to facilitate tensioning of the nut tightening spring and to retain the spring against release, said nut having ratchet teeth on one face for cooperation with the pawl spring, whereby loosening movement of the nut will be prevented in the event of breakage of the nut tightening spring.

2. An automatic take up bolt comprising a screw threaded member, a reduced shank on the screw threaded member having a slot therein dividing the shank into two branches, a nut, a spring attached to the nut and having one end bent to enter the slot, the ends of said branches having opposite inclination to facilitate winding operation of the spring before entering the slot, and a second spring adapted to occupy the reduced shank between the bent end of the first mentioned spring and the nut.

3. An automatic take up bolt comprising a screw threaded member, a shank on the screw threaded member having a longitudinally extending slot therein dividing the shank into branches, a nut having a ratchet faced surface and located on the screw threaded member, a spring attached to the nut and having one end bent to enter the slot, the ends of said branches having opposite inclination to facilitate winding operation of the spring before its bent end is brought to enter the slot, a second spring adapted to occupy the reduced shank between the bent end of the first mentioned spring and the nut, one end of the spring occupying the slot with the opposite end in direct pawl-like engagement with the ratchet face of the nut, a cup occupying the shank, having longitudinal movement thereon and closely enclosing the first mentioned spring, and means adapted to retain the cup in position, said first mentioned spring being under a normal condition of tortional tension, said second mentioned spring being under no tortional tension during normal condition of the bolt.

In testimony whereof I hereunto affix my signature.

OTTO MILLER.